(12) United States Patent
McKenney et al.

(10) Patent No.: US 7,987,166 B2
(45) Date of Patent: *Jul. 26, 2011

(54) ATOMIC RENAMING AND MOVING OF DATA FILES WHILE PERMITTING LOCK-FREE LOOK-UPS

(75) Inventors: Paul E. McKenney, Beaverton, OR (US); Dipankar Sarma, Banglagore (IN); Maneesh Soni, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 738 days.

This patent is subject to a terminal disclaimer.

(21) Appl. No.: 11/738,501

(22) Filed: Apr. 22, 2007

(65) Prior Publication Data

US 2007/0198520 A1    Aug. 23, 2007

Related U.S. Application Data

(63) Continuation of application No. 10/813,470, filed on Mar. 30, 2004, now Pat. No. 7,349,926.

(51) Int. Cl.
*G06F 17/30* (2006.01)
(52) U.S. Cl. .................. 707/704; 707/674; 707/822
(58) Field of Classification Search .......... 707/200–206, 707/625, 636, 705, 821, 822, 674, 704
See application file for complete search history.

(56) References Cited

U.S. PATENT DOCUMENTS

| | | | |
|---|---|---|---|
| 5,442,758 A | | 8/1995 | McKenney et al. |
| 5,497,484 A | * | 3/1996 | Potter et al. ................... 707/758 |
| 5,572,729 A | * | 11/1996 | Giordano et al. ..................... 1/1 |
| 5,608,893 A | | 3/1997 | McKenney et al. |
| 5,727,209 A | | 3/1998 | McKenney et al. |
| 5,806,065 A | | 9/1998 | Lomet |
| 6,052,698 A | | 4/2000 | Bennett et al. |
| 6,192,408 B1 | * | 2/2001 | Vahalia et al. ................. 709/229 |
| 6,219,690 B1 | | 4/2001 | McKenney et al. |
| 6,256,634 B1 | | 7/2001 | Moshaiov et al. |
| 6,360,220 B1 | | 3/2002 | Forin |
| 6,865,583 B2 | * | 3/2005 | Stockley ............................... 1/1 |

(Continued)

OTHER PUBLICATIONS

Paul E. McKenney et al., Read-copy update: Using Execution History to Solve Concurrency Problems, Oct. 1998, International Conference on Parallel and Distributed Computing and Systems Proceedings.
Paul E. McKenney et al., Read-copy update, Jul. 2001, Ottawa Linux Symposium Proceedings.
Hanna Linder et al., Scalability of the directory entry cache, 2002 Ottawa Linux Symposium.

(Continued)

*Primary Examiner* — Cheryl Lewis
(74) *Attorney, Agent, or Firm* — Steve Bennett

(57) ABSTRACT

Atomic renaming and moving of data files, while permitting lock-free look-ups to the data files, is disclosed. A temporary record may be created within a hash chain encompassing a record for a data file and corresponding to a location of the data file within a computer file system. The temporary record is linked within the hash chain so that the temporary record points to the same records to which the record for the data file points. The record for the data file is renamed with a new name, and/or moved to a new location within the computer file system, and the temporary record is removed from the hash chain. Before the temporary record is removed, look-ups of the data file resolve to the temporary record, the temporary record causing the look-ups to wait until the record for the data file has been renamed and/or moved and the temporary record removed.

17 Claims, 9 Drawing Sheets

U.S. PATENT DOCUMENTS

| | | | |
|---|---|---|---|
| 7,143,114 B2* | 11/2006 | Cazier | 1/1 |
| 2002/0059165 A1 | 5/2002 | Hersh et al. | |
| 2002/0059330 A1 | 5/2002 | Molnar | |
| 2002/0194436 A1 | 12/2002 | McKenney | |
| 2003/0009636 A1 | 1/2003 | Zahir | |
| 2003/0131205 A1 | 7/2003 | Huck | |
| 2003/0145210 A1 | 7/2003 | Taylor | |
| 2005/0171981 A1* | 8/2005 | Molnar | 707/200 |

OTHER PUBLICATIONS

Maurice Herlihy, A methodology for implementing highly concurrent data objects, Nov. 1993 ACM Transactions on Programming Languages and Systems.

Paul McKenney et al., Read-copy update, 2002 Ottawa Linux Symposium.

* cited by examiner

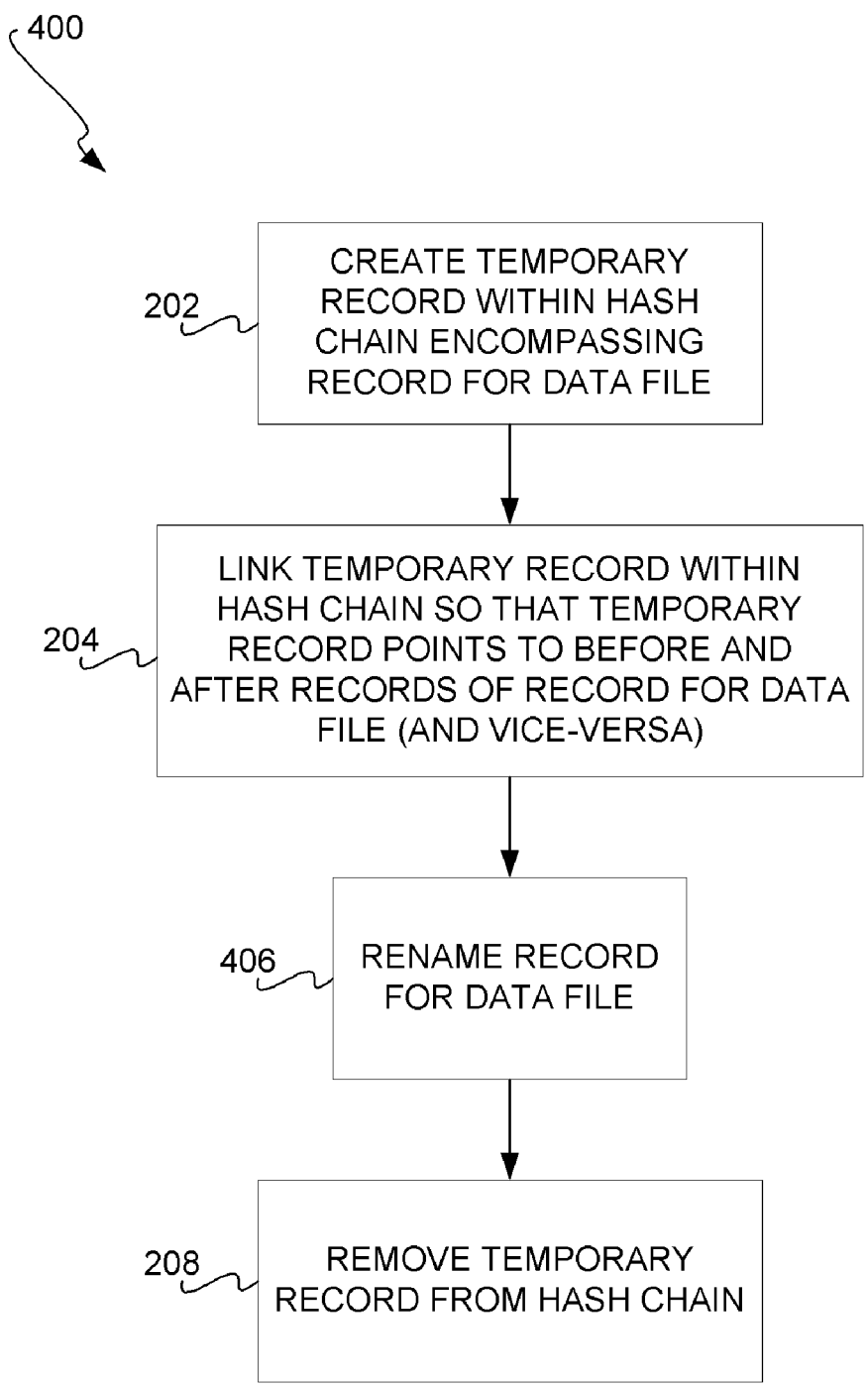

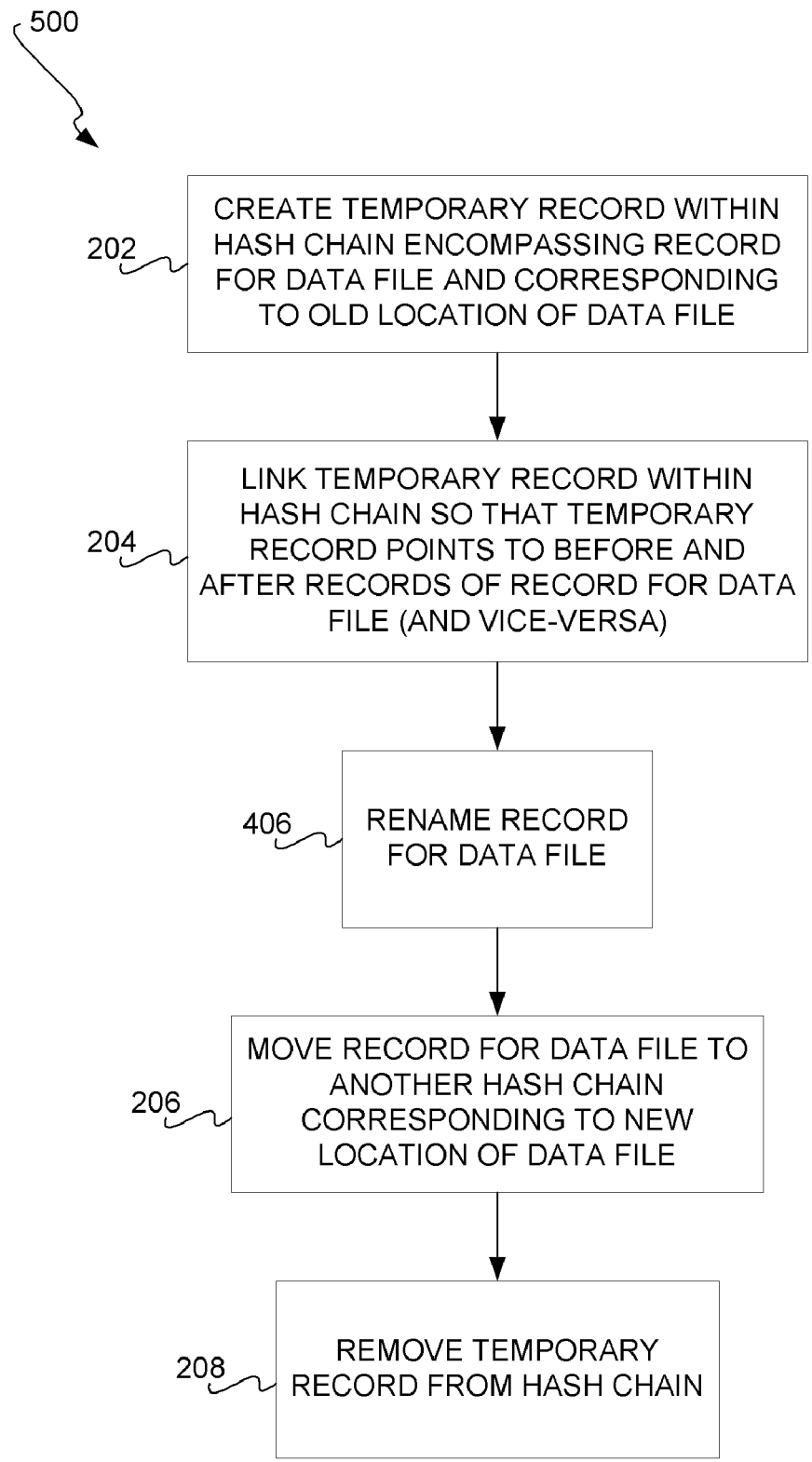

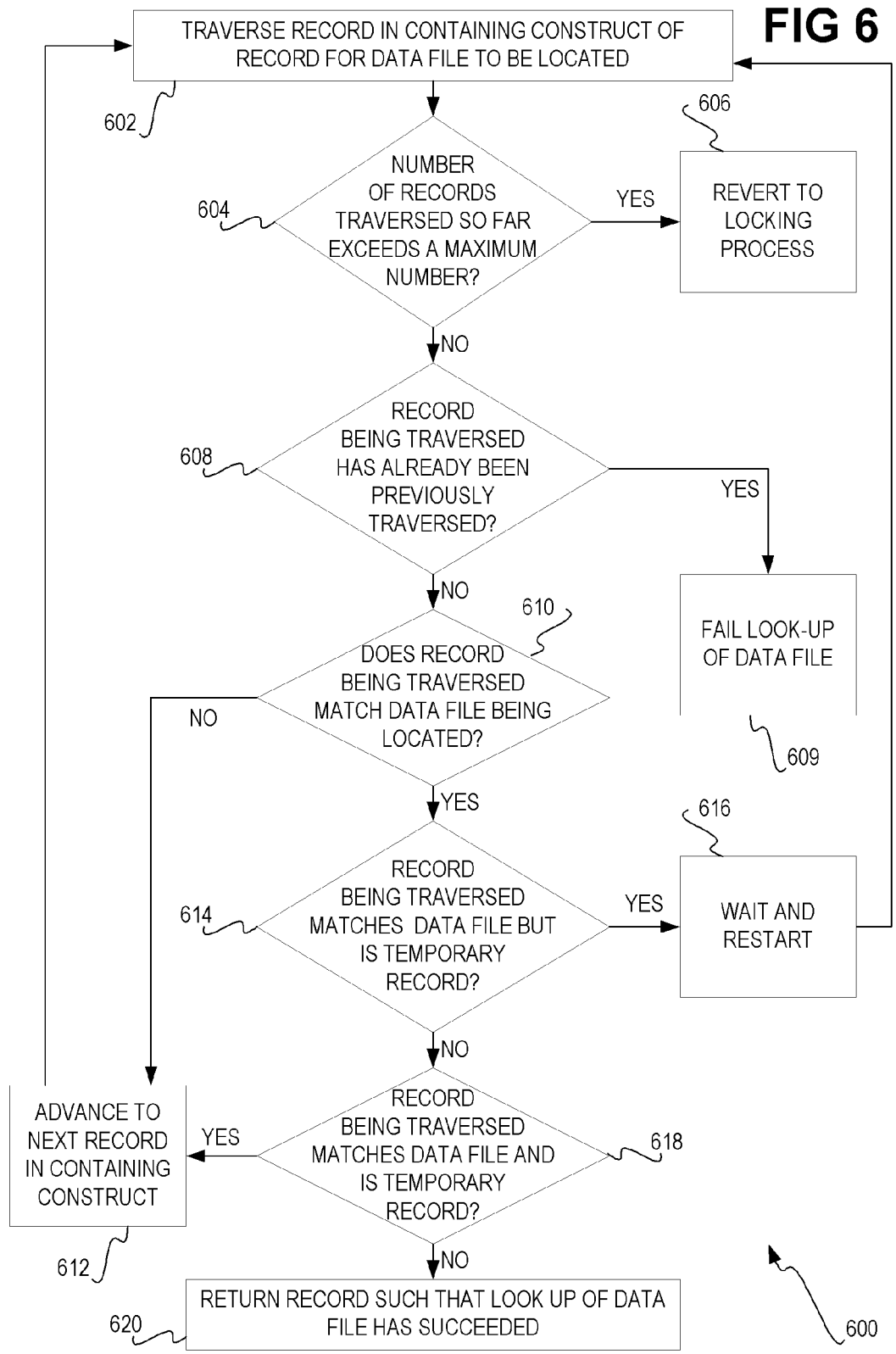

ATOMIC RENAMING AND MOVING OF DATA FILES WHILE PERMITTING LOCK-FREE LOOK-UPS

RELATED APPLICATIONS

The present patent application is a continuation of the patent application entitled "Atomic renaming and moving of data files while permitting lock-free look-ups," filed on Mar. 30, 2004, and assigned Ser. No. 10/813,470, U.S. Pat. No. 7,349,926.

FIELD OF THE INVENTION

This invention relates generally to atomically renaming and moving data files within computer file systems, and more particularly to such atomic renaming and moving of data files while permitting lock-free look-ups to the data files.

BACKGROUND OF THE INVENTION

Multiple-processor, multiple-threaded, and other types of multi-tasking computer systems allow more than one process to be executed at the same time. Such computer systems have certain performance benefits and advantages. Running more than one process at the same time is generally quicker than running one process until it is finished, and then running a second process until it is finished, and so on. Modern applications for computer systems indeed often require that more than one process be executed at the same time, either on the same processor, or on multiple processors.

However, multi-tasking computer systems can introduce processing complexities that are not present when only one process is being executed at a time. For example, data files within computer file systems are commonly renamed and/or moved. A potential problem occurs when while a data file is being renamed or moved by a first process, a second process attempts to access, or look up, the data file. The second process may initially be able to access the data file, but midway through its access of the data file, the data file is successfully renamed or moved by the first process, such that the second process is no longer able to properly access the data file.

Problems of this kind are generally prevented by guaranteeing what is referred to as atomicity of the renaming or moving process. In the context herein, the renaming or moving of a data file requires that if access to the old name or location of a data file fails, then subsequent access to the new name or location of the data file must necessarily succeed, and that if access to the new name or location of the data file succeeds, then subsequent access to the old name or location of the data file must necessarily fail. Such renaming or moving processes are therefore referred to as atomic renaming or atomic moving.

Atomicity can be provided for by the first process locking the file system and/or directories in which the data file is located, so that the second process cannot access the data file in any way until the first process completes its operations and unlocks the file system and/or directories. However, locking requires significant overhead, both on the first process that is doing the locking and unlocking, as well as on the second process that is looking up the data file. Such performance penalties are undesirable, especially when in most situations data files that are being renamed or moved by first processes will not be subject to look-ups by second processes.

A limited solution exists within version 2.6 of the kernel of the Linux operating system, which is known within the art, via its directory cache, or dcache, subsystem permitting lock-free look-ups of data files within a directory. However, this approach does not provide for atomically renaming or moving of files, and instead removes a data file's record from its old location, and then later adds a record to the new location. Therefore, to ensure atomicity, locking must nevertheless still be employed.

SUMMARY OF THE INVENTION

The invention relates to the atomic renaming and moving of data files, while permitting lock-free look-ups to the data files. A method of the invention provides for atomically renaming a data file of a computer file system, while permitting lock-free look-ups to the data file, by utilizing a temporary record to which look-ups to the data file resolve while the data file is being renamed. The method also provides for atomically moving the data file from one location to another location within the computer file system, while permitting lock-free look-ups to the data file, by utilizing a temporary record to which look-ups to the data file resolve while the data file is being moved.

Another method of the invention creates a temporary record within a hash chain encompassing a record for a data file and corresponding to a location of the data file within a computer file system. The method links the temporary record within the hash chain so that the temporary record points to a before record to which the record for the data file points and to an after record to which the record for the data file points. The record for the data file is then renamed with a new name if desired, and moved to a new location within the computer file system if desired. The temporary record is finally removed from the hash chain. While the temporary record exists within the hash chain, look-ups of the data file resolve to the temporary record, such that the temporary record causes the look-ups to wait until the record for the data file has been renamed and/or moved and the temporary record removed.

An additional method of the invention is for looking up a data file in a lock-free manner. The method traverses records of a containing construct of a record for the data file, to locate the record for the data file. The containing construct may be a hash chain, a sub-directory, or another type of containing construct. While traversing the records of the containing construct, where a number of the records traversed so far exceeds a determined maximum number of records, the method may revert to a locking process to look up the data file. Where a currently traversed record of the containing construct has already been traversed, the method returns failure of the look-up. Where a currently traversed record of the containing construct does not match the data file, then traversal of the records is continued, whereas where a currently traversed record matches the data file and is a temporary record for the data file, then the method waits until the temporary record has been removed and then restarts the look-up. Where a currently traversed record matches the data file and is the record for the data file, then the record is returned such that look-up of the data file has succeeded.

A system of the invention includes a file system in which files are stored, and means for atomically renaming and/or atomically moving from one location to another one of the files within the file system, while permitting lock-free file look-ups. An article of manufacture of the invention includes a computer-readable medium and means in the medium. The means is for atomically renaming and atomically moving from one location to another a data file, while permitting lock-free file look-ups, by using a read-copy-update approach.

Embodiments of the invention provide for advantages over the prior art. Atomic renaming and moving of data files is provided for, while permitting lock-free file look-ups. As a result, the overhead required with using locks is avoided by embodiments of the invention. Furthermore, embodiments of the invention satisfy the Portable Operating System Interface for UNIX (POSIX) renaming atomicity requirement. This requirement specifies that if access to the old name or location of a data file fails, then subsequent access to the new name or location of the data file must necessarily succeed, and that if access to the new name or location of the data file succeeds, then subsequent access to the old name or location of the data file must necessarily fail. Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 4 is a flowchart of a method for atomically renaming a data file, while permitting lock-free look-ups to the data file, according to an embodiment of the invention.

FIG. 5 is a flowchart of a method for atomically renaming a data file and for atomically moving the data file from one location to another within a computer file system, while permitting lock-free look-ups to the data file, according to an embodiment of the invention.

FIG. 6 is a flowchart of a method for performing a lock-free look-up of a data file within a containing construct of a computer file system, according to an embodiment of the invention.

DETAILED DESCRIPTION OF THE DRAWINGS

Figure 1A:
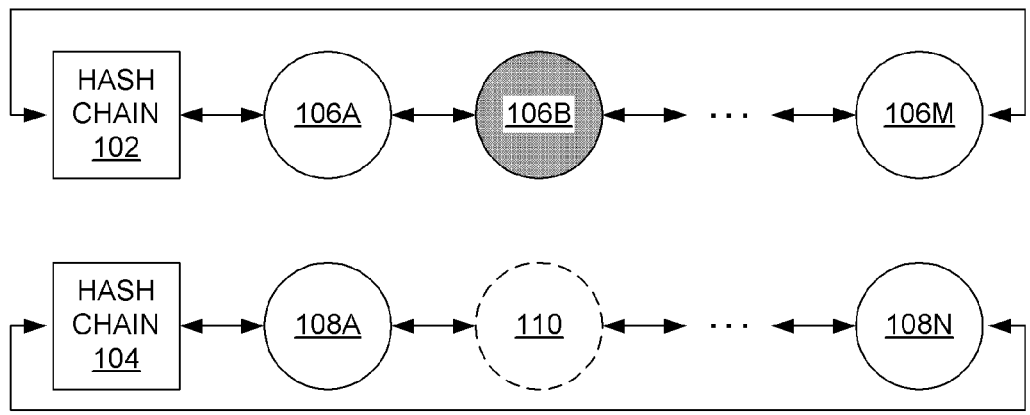
FIGS. 1A, 1B, 1C, and 1D are diagrams illustratively depicting the atomic moving of a data file from one location to another within a computer file system, while permitting lock-free look-ups to the data file, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Atomically Moving and Renaming of Data Files

FIGS. 1A, 1B, 1C, 1D illustratively depict the atomic moving of a data file, while permitting lock-free look-ups to the data file, according to an embodiment of the invention. The moving is an atomic operation in the present context in that it is completely performed, or is not performed at all, which is the definition of an atomic operation. That is, the atomic moving process cannot partially succeed, but either completely succeeds or completely fails. Within the computer file system 100, there are hash chains 102 and 104, which may also be referred to as hash buckets. The hash chain 102 includes records 106A, 106B, . . . , 106M, collectively referred to as the records 106, whereas the hash chain 104 includes records 108A, . . . , 108N, collectively referred to as the records 108.

Each of the records 106 and 108 corresponds to a given data file, indicating, for instance, the name of the data file, or a pointer to where the name of the data file is stored, as well as a pointer to where the data of the data file is itself stored. The hash chains 102 and 104 are containing constructs of the computer file system 100 for the data files to which the records 106 and 108 correspond. That is, the hash chains 102 and 104 are data structures that contain the records 106 and 108, where each of the records 106 and 108 point to a before record and an after record, such that the records 106 and 108 are linked in each of two directions. Other embodiments of the invention may include types of containing constructs other than hash chains, including trees, such as directories and sub-directories. The record for a given data file is stored in one of the hash chains 102 and 104 based on its hash value. The hash value is determined as a result of a hash function, which inputs all or part of the data file, and outputs into which of the hash chains 102 and 104 the record for the data file should be placed.

Referring specifically to FIG. 1A, the record 106B is denoted by shading, to indicate that the data file corresponding to the record 106B is to be moved from one location to another within the computer file system 100, such that the record 106B is to be moved from the hash chain 102 to the hash chain 104. Specifically, the record 106B is to be moved from its current location within the hash chain 102 to the location 110 within the hash chain 104, where the location 110 is indicated by dotted lines. Movement of the record 106B from the hash chain 102 to the hash chain 104 is accomplished atomically, while permitting lock-free look-ups to the data file, as is now specifically described below.

Figure 1B:
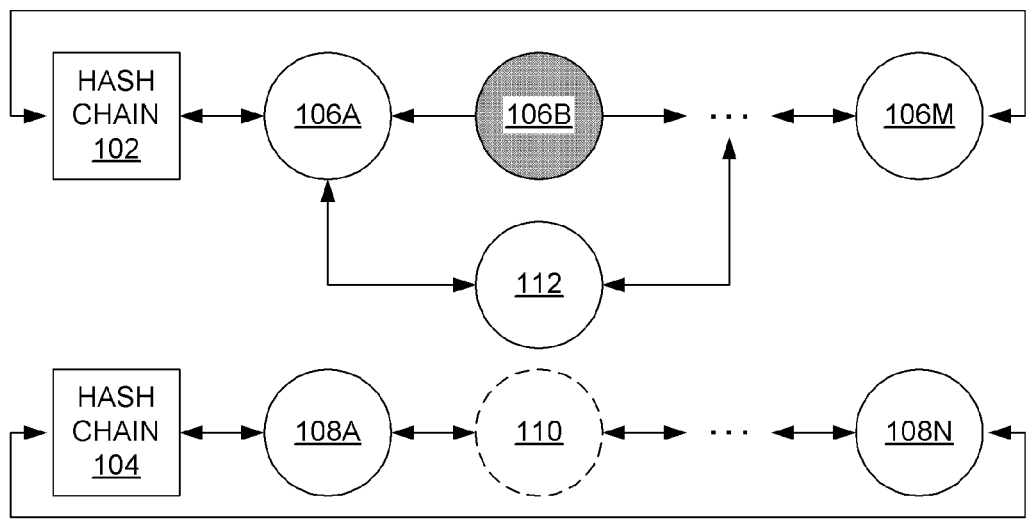

Referring specifically to FIG. 1B, a temporary record 112 has been created and linked within the hash chain 102. The temporary record 112 may also be referred to as a tombstone record. The temporary record 112 is linked within the hash chain 102 so that look-ups of the data file to which the record 106B corresponds instead resolve to the temporary record 112. Therefore, the temporary record 112 links to the records to which the record 106B links, and the records that link to the record 106B are made instead to link to the temporary record 112. For example, the temporary record 112 links to the record 106A, which is the before record to the record 106B, because it is the record most immediately before the record 106B within the chain 102. Furthermore, the record 106A now links to the temporary record 112. It is noted that the after record to the record 106B is the record most immediately after the record 106B within the chain 102; however, this after record is not particularly depicted in FIG. 1B.

The utilization of the temporary, or tombstone, record 112 as a placeholder for the record 106B while the record 106B is being atomically moved enables lock-free look-ups to the data file to which the record 106B corresponds. When look-ups to the data file resolve to the temporary record 112 once the record 112 has been created and linked within the hash chain 102, the record 112 causes the look-ups to wait until the record 106B has been atomically moved and the record 112 removed. For instance, looking up of the record 112 may result in the record 112 returning a "busy" response, indicating to that looking up process that it should try to look up the record 112 at a later point in time. This advantageously enables the process performing the look-up to perform other functionality when indicated by the record 112 that it is busy. Thus, look-ups to the data file to which the record 106B corresponds are performed in a lock-free manner, that is, without utilizing locks on the hash chain 102.

Figure 1C:
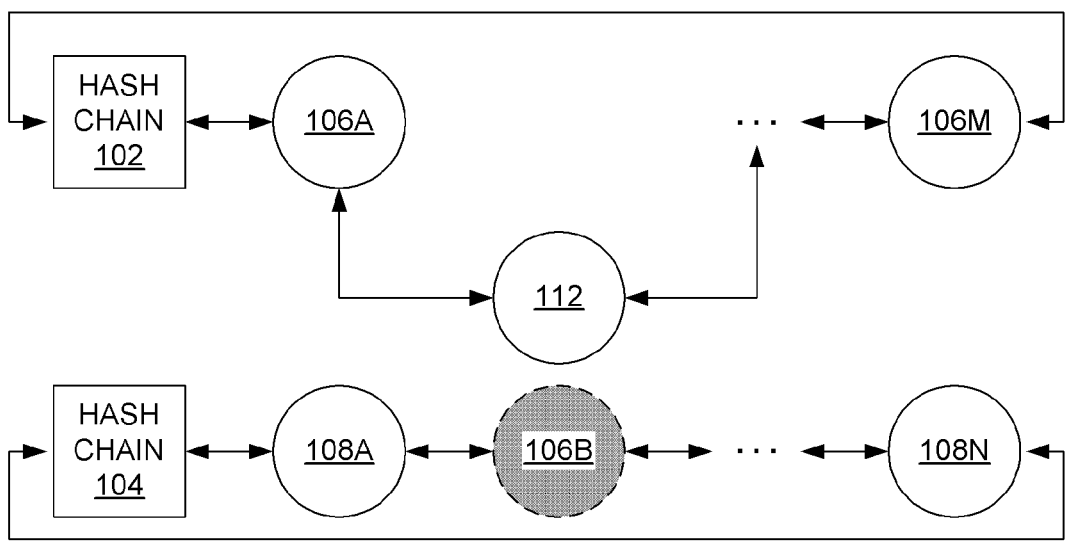

Referring next to FIG. 1C, once the temporary record 112 has been created and linked within the hash chain 102, the record 106B is then moved from the hash chain 102 to the hash chain 104, at the location previously indicated as the location 110. Movement of the record 106B includes linking the record 106B within the hash chain 104. Therefore, the record 106B is linked in a forward direction and in a backward direction within the hash chain 104. For example, the record 106B links to a new before record, the record 108A, which itself links to the 106B. Similarly, the record 106B links to a new after record, which is not specifically denoted in FIG. 1C. It is noted that before and after this process occurs, the record 106B retains its address, and does not receive a new address.

Figure 1D:
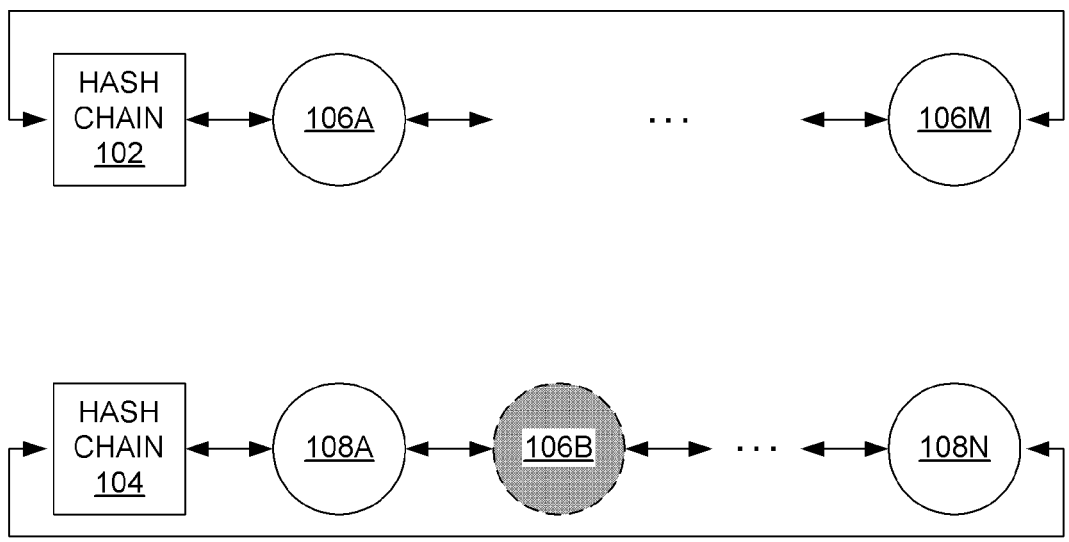

Referring next to FIG. 1D, once the record 106B has been moved from its original location within the computer file system 100 within the hash chain 102 to its new location within the computer file system 100 within the hash chain 104, the temporary record 112 is finally removed. Subsequent look-ups of the data file to which the record 106B corresponds now properly resolve to the record 106B at its new location within the hash chain 104. Any look-ups that had been waiting as a result of previously resolving to the temporary record 112 can now restart so that they properly resolve to the record 106B. Thus, the data file to which the record 106B corresponds has been atomically moved within the computer file system 100, while permitting lock-free look-ups to the data file.

Figure 2:
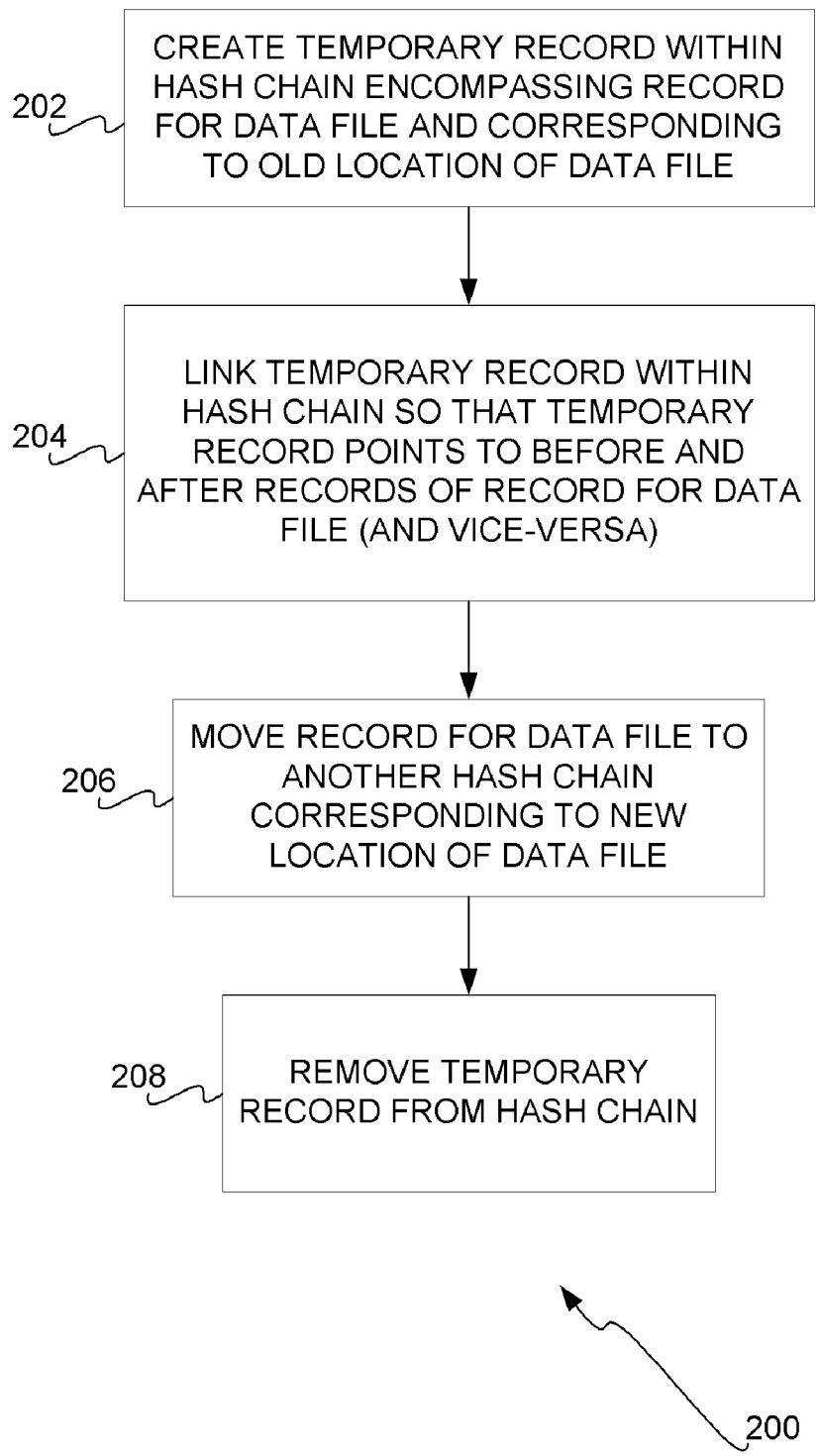
FIG. 2 is a flowchart of a method for atomically moving a data file from one location to another within a computer file system, while permitting lock-free look-ups to the data file, according to an embodiment of the invention.

FIG. 2 shows a method 200 for atomically moving a data file from one location within a computer file system to another location within the computer file system, while permitting lock-free look-ups to the data file, according to an embodiment of the invention. The method 200 thus summarizes the atomic movement that has been illustratively described in relation to FIGS. 1A-1D. The method 200, like other methods of embodiments of the invention, may be implemented in conjunction with a computer-readable medium of an article of manufacture. The medium may be a recordable data storage medium, a modulated carrier signal, or another type of medium.

First, a temporary record is created within the hash chain encompassing the record for the data file to be moved, where the hash chain corresponds to the old location of the data file (202). An example of the creation of such a temporary record has been particularly described in relation to FIGS. 1A and 1B. The temporary record is linked within the hash chain so that it points to the before and after records of the record for the data file to be moved, and so that these before and after records point to the temporary record (204). An example of such linking has been particularly described in relation to FIG. 1B.

The record for the data file is then moved to another hash chain that corresponds to the new location for the data file (206), an example of such movement having been particularly described in relation to FIG. 1C. The temporary record is removed from the hash chain within which it was created and linked (208), an example of such removal having been particularly described in relation to FIG. 1D. It is noted that the temporary record is removed by inserting the moved data file's record into its place. While the temporary record exists and the record for the data file is being moved, look-ups of the data file resolve to the temporary record, such that the temporary record causes these look-ups to wait until the record for the data file has been moved and the temporary record removed.

FIGS. 3A, 3B, 3C, and 3D illustratively depict the atomic renaming of a data file, while permitting lock-free look-ups to the data file, according to an embodiment of the invention. As before, the renaming is an atomic operation in the present context in that it is completely performed, or is not performed at all. Within the computer file system 100, the hash chain 102 is specifically depicted, and includes records 106A, 106B, ..., 106M, collectively referred to as the records 106. Each of the records 106 corresponds to a given data file, whereas the hash chain 102 is a containing construct of the computer file system 100 for the data files to which the records 106 correspond.

Figure 3A:
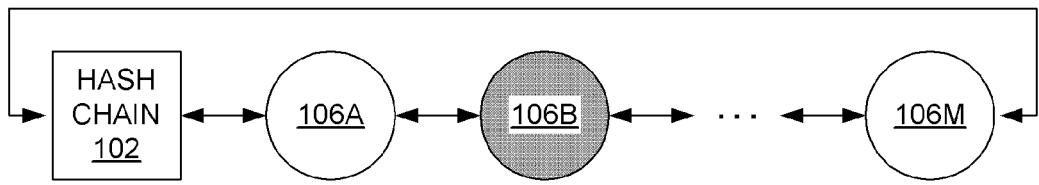
FIGS. 3A, 3B, 3C, and 3D are diagrams illustratively depicting the atomic renaming of a data file, while permitting lock-free look-ups to the data file, according to an embodiment of the invention.
Figure 3B:
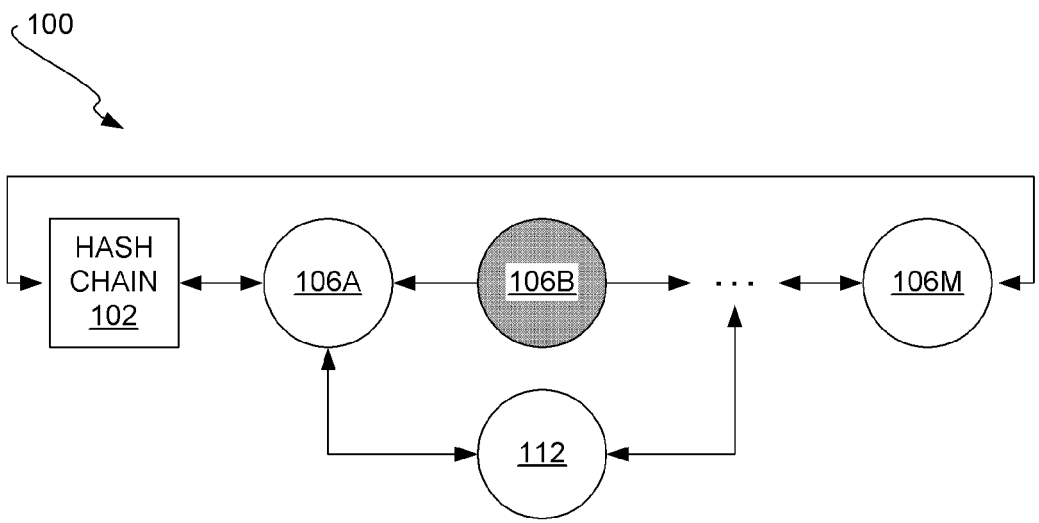

Referring specifically to FIG. 3A, the record 106B is denoted by shading, to indicate that the data file corresponding to the record 106B is to be renamed. Renaming of the record 106B is accomplished atomically, while permitting lock-free look-ups to the data file, as is now specifically described. Referring specifically to FIG. 3B, a temporary record 112 has been created and linked within the hash chain 102. The temporary record 112 may also be referred to as a tombstone record. The temporary record 112 is linked within the hash chain 102 so that look-ups of the data file to which the record 106B corresponds instead resolve to the temporary record 112. Therefore, the temporary record 112 links to the records to which the record 106B, and these records are made to link to the record 112 instead of to the record 106B.

The utilization of the temporary, or tombstone, record 112 as a placeholder for the record 106B while the record 106B is being atomically renamed enables lock-free look-ups to the data file to which the record 106B corresponds. When look-ups to the data file resolve to the temporary record 112 once the record 112 has been created and linked within the hash chain 112, the record 112 causes the look-ups to wait until the record 106B has been atomically renamed and the record 112 removed. Look-ups to the data file to which the record 106B corresponds are thus performed in a lock-free manner.

Figure 3C:
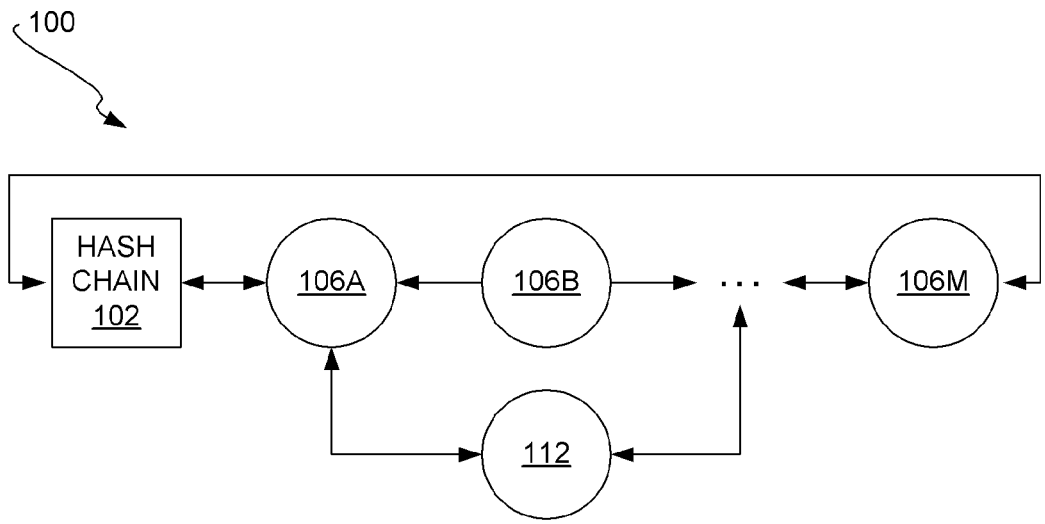

Referring next to FIG. 3C, once the temporary record 112 has been created and linked within the hash chain 102, the record 106B is renamed. Renaming may be accomplished in one of two ways. First, the name may be stored directly within the record 106B itself, such that the name is simply changed. Second, the name may be stored in a data entity other than the record 106B, such that the record 106B points to this data entity. In this instance, a new data entity may be created with the new name for the data file to which the record 106B corresponds, and the record 106B caused to point to the new data entity.

Figure 3D:
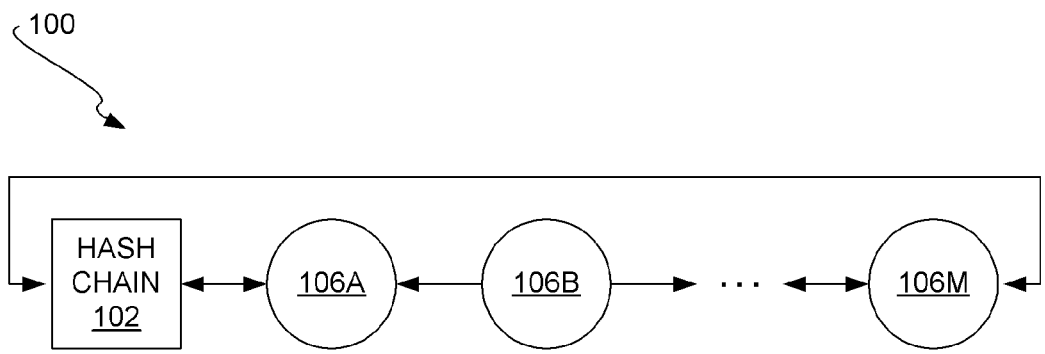

Referring next to FIG. 3D, once the record 106B has been renamed, the temporary record 112 is removed, and the before and after records that had previously linked to the record 106B are again caused to link to the record 106B. Subsequent look-ups of the data file to which the record 106B corresponds now properly resolve to the record 106B with its new name for the data file. Any look-ups that had been waiting as a result of previously resolving to the temporary record 112 can now restart so that they properly resolve to the record 106B. Thus, the data file to which the record 106B corresponds has been atomically renamed, while permitting lock-free look-ups to the data file.

FIG. 4 shows a method 400 for atomically renaming a data file within a computer file system, while permitting lock-free look-ups to the data file, according to an embodiment of the invention. The method 400 thus provides the steps needed to achieve the atomic renaming that has been illustratively described in relation to FIGS. 3A-3D. Like-numbered parts of the method 400 as compared to the method 200 of FIG. 2 are performed at least substantially identically. A temporary record is first created within the hash chain encompassing the record for the data file to be renamed (202). An example of the creation of such a temporary record has been particularly described in relation to FIGS. 3A and 3B.

The temporary record is then linked within the hash chain so that it points to the before and after records of the record for the data file to be renamed, and so that these before and after records point to the temporary record (204). An example of such linking has been particularly described in relation to FIG. 3B. The record for the data file is renamed (406), an example of such renaming having been particularly described in relation to FIG. 3C. The temporary record is then removed from the hash chain (208), an example of such removal having been particularly described in relation to FIG. 3D. It is noted that the temporary record is removed by inserting the renamed data file's record into its place. While the temporary record exists and the record for the data file is being renamed, look-ups of the data file resolve to the temporary record, such that the temporary record causes these look-ups to wait until the record for the data file has been renamed and the temporary record has been removed.

FIG. 5 shows a method 500 for atomically renaming a data file, and atomically moving the data file from one location within a computer file system to another location within the computer file system, while permitting lock-free look-ups to the data file, according to an embodiment of the invention. The method 500 thus combines the methods 200 of FIG. 2 and 400 of FIG. 5 that have been described. Like-numbered parts of the method 500 as compared to the methods 200 and 400 are performed at least substantially identically.

First, a temporary record within the hash chain encompassing the record for the data file and corresponding to the old location of the data file is created (202). The temporary record within the hash chain is linked so that it points to the before and after records of the record for the data file, and so that these before and after records point to the temporary record (204). The record for the data file can then be renamed (406), preferably before it is moved to another hash chain corresponding to the new location of the data file (206). However, the renaming of the record of the data file can be done after it is moved to another hash chain. The temporary record is finally removed (208). It is noted that the temporary record is removed by inserting the moved and renamed data file's record into its place. While the temporary record exists and the record for the data file is being renamed and moved, look-ups of the data file resolved to the temporary record, causing these look-ups to wait until the record for the data file has been renamed and moved and the temporary record removed.

Lock-Free Look-Ups of Data Files

FIG. 6 shows a method 600 for performing a lock-free look-up of a data file that can be used in conjunction with the methods 200, 400, and 500 of FIGS. 2, 4, and 5, according to an embodiment of the invention. As may be appreciated by those of ordinary skill within the art, other approaches for performing a lock-free look-up of a data file can also be used in conjunction with the methods 200, 400, and 500. The method 600 is specifically for performing a look-up of a data file that has a corresponding record within a containing construct, such as a hash chain or a directory or sub-directory. Furthermore, the method 600 may be performed as an additional part of any of the methods 200, 400, and 500.

A record in the containing construct is traversed to locate the record of the data file in question (602). If the number of records that have been traversed so far exceeds a maximum number of records (604), then a locking process, as known within the art, is reverted to in order to look up the data file (606). Otherwise, if the record being traversed has already been previously traversed (608), then this means that the data file cannot be located, and the look-up of the data file fails (609). If the record being traversed does not correspond to, or match, the data file to be located (610), then the method 600 advances to the next record in the containing construct (612), and repeats at 602.

If the record being traversed matches the data file, but is a temporary, or tombstone, record (614), such as the record 112 that has been described in relation to FIGS. 1A-1D and FIGS. 3A-3D, then the method 600 waits and restarts (616) once the temporary record has been removed. In this way, the method 600 is performed in a lock-free manner, without using locks while a record corresponding to the data file in question is being renamed and/or moved. If the record that is being traversed matches the data file, however, and is not a temporary record (618), then this means that the record being traversed is the actual record corresponding to the data file. This record is returned, such that look-up of the data file has succeeded (620). Otherwise, the method 600 advances to the next record in the containing construct (612), and repeats at 602.

The maximum number of records to traverse in (614) may be determined in one embodiment of the invention as is now described. Ensuring that only a finite number of records may be traversed ensures that an infinite loop is not entered into by performing the method 600. Where a record is to end up in the same hash chain as that in which it currently resides, the temporary record may be inserted before the record in question, instead of replacing it as has been described. The number of records in each hash chain may be determined based on a header element that contains this number. Alternatively, a function of the maximum number of records in a hash chain may be used to estimate the maximum number of records. In one embodiment, if movement of records occurs relatively infrequently, then checking the number of records that have been traversed in 604 may not be performed.

The waiting process in 616 may be accomplished in one embodiment of the invention as is now described. First, one or more global or per-element semaphores may be employed. A semaphore is a shared space for inter-process communications controlled by "wake up" and "sleep" commands. The source process fills a queue and goes to sleep until the destination process uses the data and tells the source process to wake up. Second, a global or a per-element lock may be used. However, this may be undesirable, since such usage introduces employment of a lock within the process.

Systems

Figure 7A:
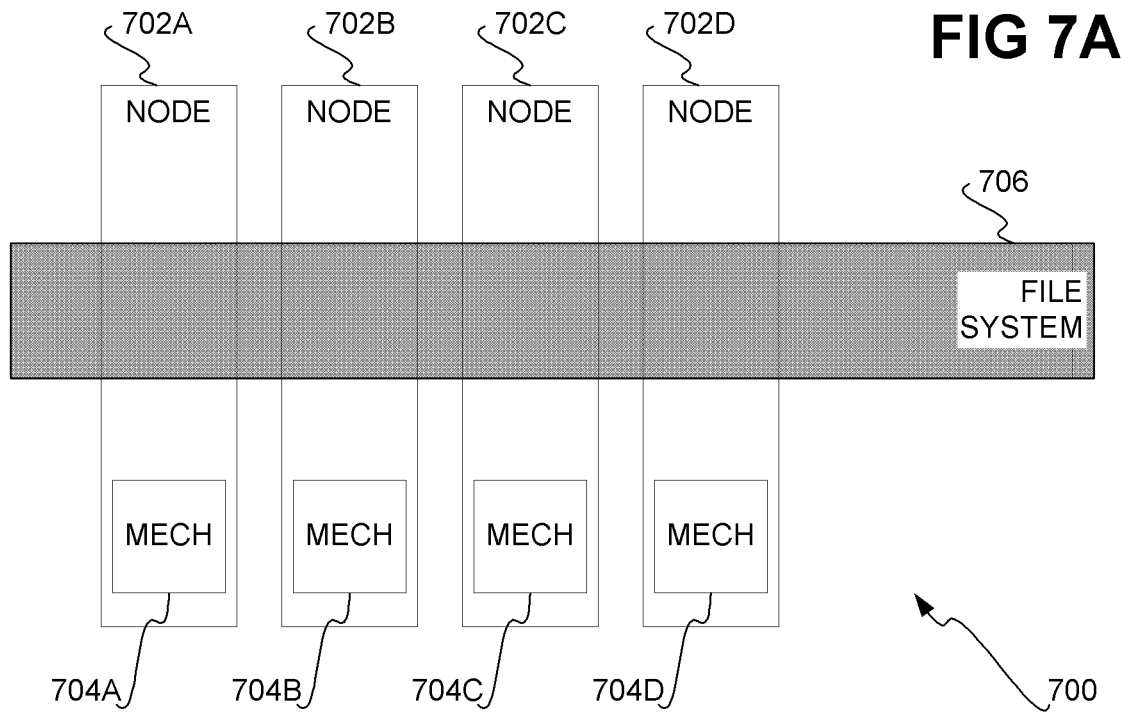
FIGS. 7A and 7B are diagrams of systems, according to differing embodiments of the invention.
Figure 7B:
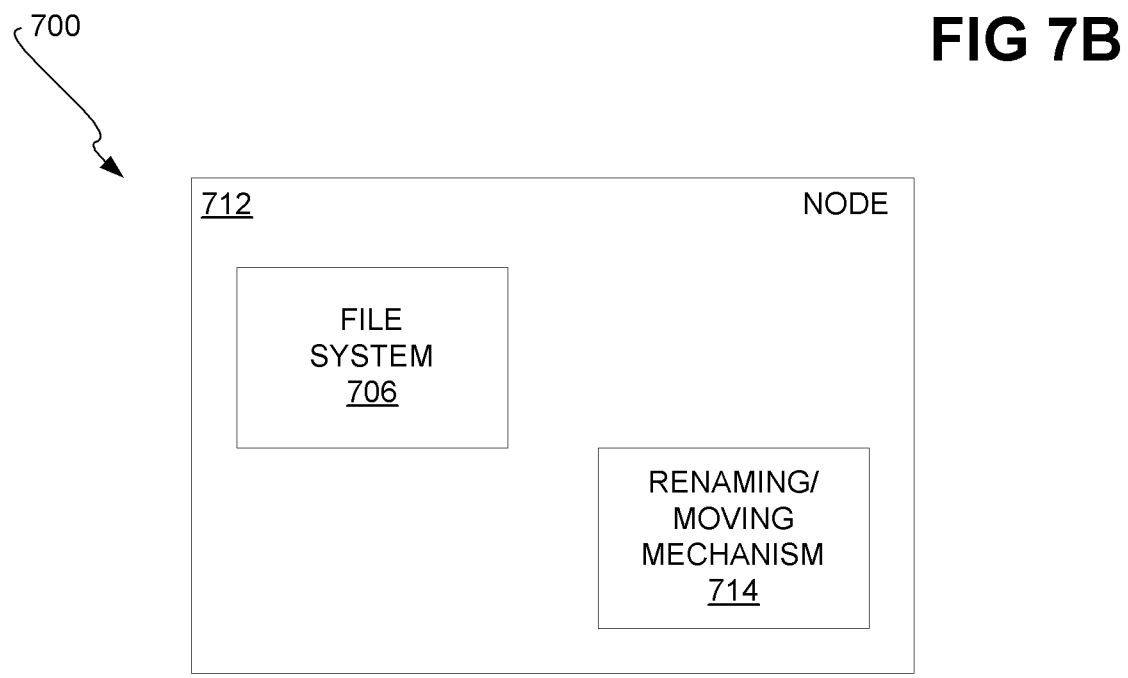

FIGS. 7A and 7B show a system 700 in conjunction with which the atomic renaming and moving of data files that has been described may be implemented, according to varying embodiments of the invention. Referring first to FIG. 7A, the system 700 is made up of computing nodes 702A, 702B, 702C, and 702D, collectively referred to as the nodes 702. Each of the nodes 702 may include components in addition to and/or in lieu of those depicted in FIG. 7A, such as memory, processors, and so on. There may further be more or less than the four nodes 702 depicted in FIG. 7.

A computer file system 706 is implemented in a distributed fashion over the nodes 702. The computer file system 706 is meant to store data files, such as those that may be atomically renamed and moved in a manner as has been described herein previously. The nodes 702A, 702B, 702C, and 702D have renaming/moving mechanisms 704A, 704B, 704C, and 704D, collectively referred to as the mechanisms 704, to atomically rename files within the file system 706, and/or move them from one location to another within the file system 706, while permitting lock-free file look-ups. The mechanisms 704 may be implemented as hardware, software, or as a combination of hardware and software, and may perform any of the methods 200, 400, and 500 of FIGS. 2, 4, and 5 that have been described.

In one embodiment of the invention, the mechanisms 704 satisfy the Portable Operating System Interface for UNIX (POSIX) renaming atomicity requirement when renaming and/or moving data files. This requirement specifies that if access to the old name or location of a data file fails, then subsequent access to the new name or location of the data file must necessarily succeed. This requirement also specifies that if access to the new name or location of the data file succeeds, then subsequent access to the old name or location of the data file must necessarily fail.

Referring next to FIG. 7B, the system 700 is made up of a single computing node 712, which like the nodes 702, may include components in addition to and/or in lieu of those depicted in FIG. 7B, such as processors, memory, input devices like keyboards and mice, output devices like printers, as well as communication devices like network adapters and modems. The computer file system 706 is completely implemented within the single node 712. The node 712 includes a renaming/moving mechanism 714 comparable to the mechanisms 704. That is, the mechanism 714 is to atomically rename files within the file system 706, and/or move them from one location to another within the file system 706, while permitting lock-free file look-ups. The mechanism 714 may be implemented as hardware, software, or as a combination of hardware and software, and may perform any of the methods 200, 400, and 500 of FIGS. 2, 4, and 5 that have been described. The mechanism 714 may further satisfy the POSIX renaming atomicity requirement.

Implementation Details of Specific Embodiments and Conclusion

The preceding description of varying embodiments of the invention is sufficient to enable those of ordinary skill within the art to make and use the invention. In this section of the detailed description, various implementation details are provided for specific embodiments of the invention, however. Such implementation details may be desired to be used by those of ordinary skill within the art when practicing a specific and/or alternative embodiment of the invention.

In the embodiments of the invention that have been described, it has been presumed that the name of a record is atomically changeable. In some situations, however, this may not be the case. Therefore, the actual renaming of the record may be accomplished as follows. The record is removed from the hash chain in question after the temporary record therefore is inserted. A grace period is waited for to be elapsed, to guarantee that no processes are currently looking up or otherwise referring to the element. The name of the record is then changed non-atomically, reinserted into the hash chain, and the temporary record removed as before.

The architectures of some systems may only provide for weak memory consistency, or coherency, among nodes. In such situations, a write memory-barrier instruction may be executed before the temporary record is created. This ensures that the temporary record is not written over by other processes. Furthermore, a read-copy-update primitive may be employed after the temporary record has been deleted, to free up the memory used by the temporary record after a grace period has elapsed. Such a primitive may also be employed when renaming a record, where the record has a pointer to another data entity that stores the actual name, such that the data entity storing the old name of the record is deleted.

It is noted that, although specific embodiments have been illustrated and described herein, it will be appreciated by those of ordinary skill in the art that any arrangement calculated to achieve the same purpose may be substituted for the specific embodiments shown. For example, whereas embodiments of the invention have been substantially described in relation to hash chains, other embodiments of the invention are applicable to other organizational constructs. This application is intended to cover any adaptations or variations of embodiments of the present invention. Therefore, it is manifestly intended that this invention be limited only by the claims and equivalents thereof.

We claim:

1. A computer-implemented method comprising:
    renaming a data file of a computer system while permitting lock-free look-ups to the data file by utilizing a temporary record to which look-ups to the data file resolve while the data file is being renamed;
    looking up the data file in a lock free-manner while the data file is being atomically renamed, by, while traversing records of a containing construct of a record for the data file to locate the record for the data file:
        where a number of the records of the containing construct traversed so far exceeds a predetermined maximum number of records, reverting to a locking process to look up the data file;
        where a currently traversed record of the containing construct has already been traversed, returning failure of the look-up of the data file;
        where a currently traversed record of the containing construct does not match the data file, continuing traversal of the records of the containing construct;
        where a currently traversed record of the containing construct matches the data file and is a temporary record for the data file, waiting until the temporary record has been removed and restarting look-up of the data file; and,
        where a currently traversed record of the containing construct matches the data file and is the record for the data file, returning the record such that look-up of the data file has succeeded.

2. The method of claim 1, wherein renaming the data file comprises atomically renaming the data file.

3. The method of claim 2, wherein atomically renaming the data file of the computer file system while permitting lock-free look-ups to the data file comprises atomically renaming the data file of the computer file system such that once a look-up of an old name of the data file necessarily fails, any subsequent look-up of a new name of the data file necessarily succeeds, and such that once a look-up of the new name of the data file necessarily succeeds, any subsequent look-up of the old name of the data file necessarily fails.

4. The method of claim 1, wherein the containing construct of the record for the data file is one of a hash chain and a sub-directory.

5. A computer-implemented method comprising:
   atomically moving a data file from one location to another location within a computer file system while permitting lock-free look-ups to the data file by utilizing a temporary record to which look-ups to the data file resolve while the data file is being moved,
   wherein atomically moving the data file from one location to another location within the computer file system comprises:
      creating a temporary record within a hash chain encompassing a record for the data file and corresponding to an old location of the data file within the computer file system;
      linking the temporary record within the hash chain so that the temporary record points to a before record to which the record for the data file points and to an after record to which the record for the data file points;
      moving the record for the data file to another hash chain corresponding to a new location of the data file within the computer file system; and,
      removing the temporary record from the hash chain,
   wherein while the temporary record exists within the hash chain, look-ups of the data file resolve to the temporary record, such that the temporary record causes the look-ups to wait until the record for the data file has been moved to the other hash chain and the temporary record removed.

6. The method of claim 5, further comprising, while traversing records of a containing construct of a record for the data file to locate the record for the data file:
   where a number of the records of the containing construct traversed so far exceeds a predetermined maximum number of records, reverting to a locking process to look up the data file;
   where a currently traversed record of the containing construct has already been traversed, returning failure of the look-up of the data file;
   where a currently traversed record of the containing construct does not match the data file, continuing traversal of the records of the containing construct;
   where a currently traversed record of the containing construct matches the data file and is a temporary record for the data file, waiting until the temporary record has been removed and restarting look-up of the data file; and,
   where a currently traversed record of the containing construct matches the data file and is the record for the data file, returning the record such that look-up of the data file has succeeded.

7. A computer-implemented method comprising:
   creating a temporary record within a hash chain encompassing a record for a data file and corresponding to a location of the data file within a computer file system;
   linking the temporary record within the hash chain so that the temporary record points to a before record to which the record for the data file points and to an after record to which the record for the data file points;
   renaming the record for the data file with a new name; and,
   removing the temporary record from the hash chain,
   wherein while the temporary record exists within the hash chain, look-ups of the data file resolve to the temporary record, such that the temporary record causes the look-ups to wait until the record for the data file has been renamed and the temporary record has been removed.

8. The method of claim 7, further comprising, prior to removing the temporary record from the hash chain, moving the record for the data file to another hash chain corresponding to a new location of the data file within the computer file system, wherein while the temporary record exists within the hash chain, look-ups of the data file resolve to the temporary record, such that the temporary record causes the look-ups to wait until the record for the data file has been renamed and moved to the other hash chain and the temporary record has been removed.

9. The method of claim 7, further comprising looking-up the data file in a lock-free manner, by traversing records of the hash chain encompassing the record for the data file to locate the record for the data file, and where a currently traversed record of the hash chain matches the data file and is a temporary record for the data file, waiting until the temporary record has been removed and then restarting look-up of the data file.

10. A computer-implemented method comprising:
    creating a temporary record within a hash chain encompassing a record for a data file and corresponding to a location of the data file within a computer file system;
    linking the temporary record within the hash chain so that the temporary record points to a before record to which the record for the data file points and to an after record to which the record for the data file points;
    moving the record for the data file to another hash chain corresponding to a new location of the data file within the computer file system; and,
    removing the temporary record from the hash chain,
    wherein while the temporary record exists within the hash chain, look-ups of the data file resolve to the temporary record, such that the temporary record causes the look-ups to wait until the record for the data file has been moved and the temporary record removed.

11. The method of claim 10, further comprising, prior to moving the record for the data file to the other hash chain, renaming the record for the data file with a new name, wherein while the temporary record exists within the hash chain, look-ups of the data file resolve to the temporary record, such that the temporary record causes the look-ups to wait until the record for the data file has been renamed and moved to the other hash chain and the temporary record removed.

12. The method of claim 10, further comprising looking-up the data file in a lock-free manner, by traversing records of the hash chain encompassing the record for the data file to locate the record for the data file, and where a currently traversed record of the hash chain matches the data file and is a temporary record for the data file, waiting until the temporary record has been removed and then restarting look-up of the data file.

13. A computer-implemented system comprising:
    a file system in which a plurality of files are stored; and,
    means for at least one of atomically renaming and atomically moving from one location to another one of the files within the file system, while permitting lock-free file look-ups,
    wherein atomically renaming the one of the files is achieved by the means:
       creating a temporary record within a hash chain encompassing a record for a data file and corresponding to a location of the data file within the file system, the data file being the one of the files;

linking the temporary record within the hash chain so that the temporary record points to a before record to which the record for the data file points and to an after record to which the record for the data file points;

renaming the record for the data file with a new name; and, removing the temporary record from the hash chain, where while the temporary record exists within the hash chain, look-ups of the data file resolve to the temporary record, such that the temporary record causes the look-ups to wait until the record for the data file has been renamed and the temporary record has been removed, wherein atomically moving the one of the files is achieved by the means:

creating a temporary record within a hash chain encompassing a record for the data file and corresponding to the location of the data file within the file system;

linking the temporary record within the hash chain so that the temporary record points to a before record to which the record for the data file points and to an after record to which the record for the data file points;

moving the record for the data file to another hash chain corresponding to a new location of the data file within the computer file system; and, removing the temporary record from the hash chain, where while the temporary record exists within the hash chain, look-ups of the data file resolve to the temporary record, such that the temporary record causes the look-ups to wait until the record for the data file has been moved and the temporary record removed.

14. The system of claim 13, wherein the system comprises a plurality of computing nodes over which the file system is implemented.

15. The system of claim 13, wherein the system comprises a single computing node within which the file system is implemented.

16. A non-transitory computer-readable data storage medium to store a computer program that when executable by a processor causes a method to be performed, comprising:

creating a temporary record within a hash chain encompassing a record for a data file and corresponding to a location of the data file within a computer file system;

linking the temporary record within the hash chain so that the temporary record points to a before record to which the record for the data file points and to an after record to which the record for the data file points;

renaming the record for the data file with a new name; and, removing the temporary record from the hash chain, wherein while the temporary record exists within the hash chain, look-ups of the data file resolve to the temporary record, such that the temporary record causes the look-ups to wait until the record for the data file has been renamed and the temporary record has been removed.

17. A non-transitory computer-readable data storage medium to store a computer program that when executable by a processor causes a method to be performed, comprising:

creating a temporary record within a hash chain encompassing a record for a data file and corresponding to a location of the data file within a computer file system;

linking the temporary record within the hash chain so that the temporary record points to a before record to which the record for the data file points and to an after record to which the record for the data file points;

moving the record for the data file to another hash chain corresponding to a new location of the data file within the computer file system; and, removing the temporary record from the hash chain, wherein while the temporary record exists within the hash chain, look-ups of the data file resolve to the temporary record, such that the temporary record causes the look-ups to wait until the record for the data file has been moved and the temporary record removed.

* * * * *